Jan. 10, 1928.
E. ARTAS
MOTOR TRUCK LOADER
Filed Jan. 15, 1926
1,655,686
2 Sheets-Sheet 1
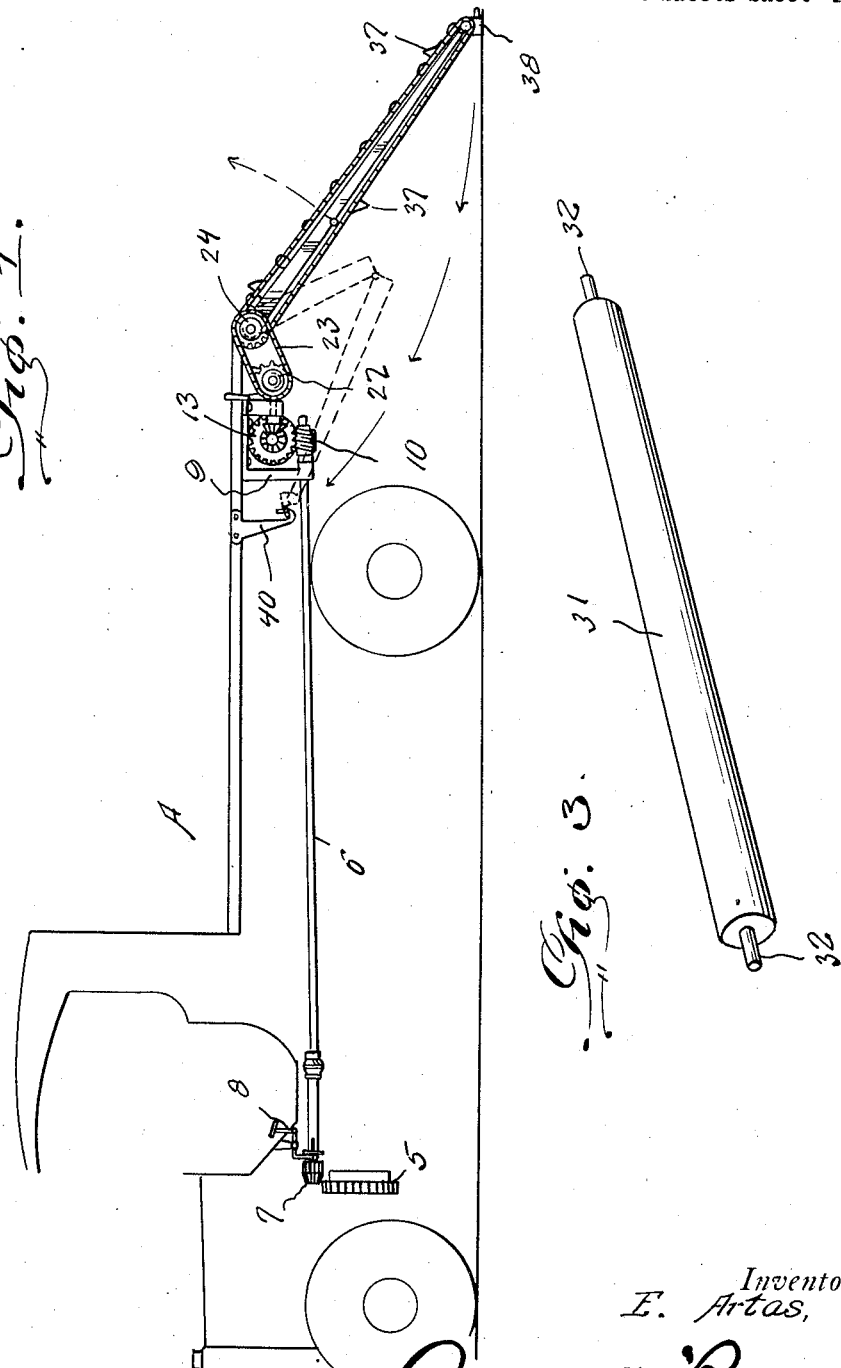
Inventor
E. Artas,
By Clarence A. O'Brien
Attorney Jan. 10, 1928.
E. ARTAS
1,655,686
MOTOR TRUCK LOADER
Filed Jan. 15, 1926   2 Sheets-Sheet 2
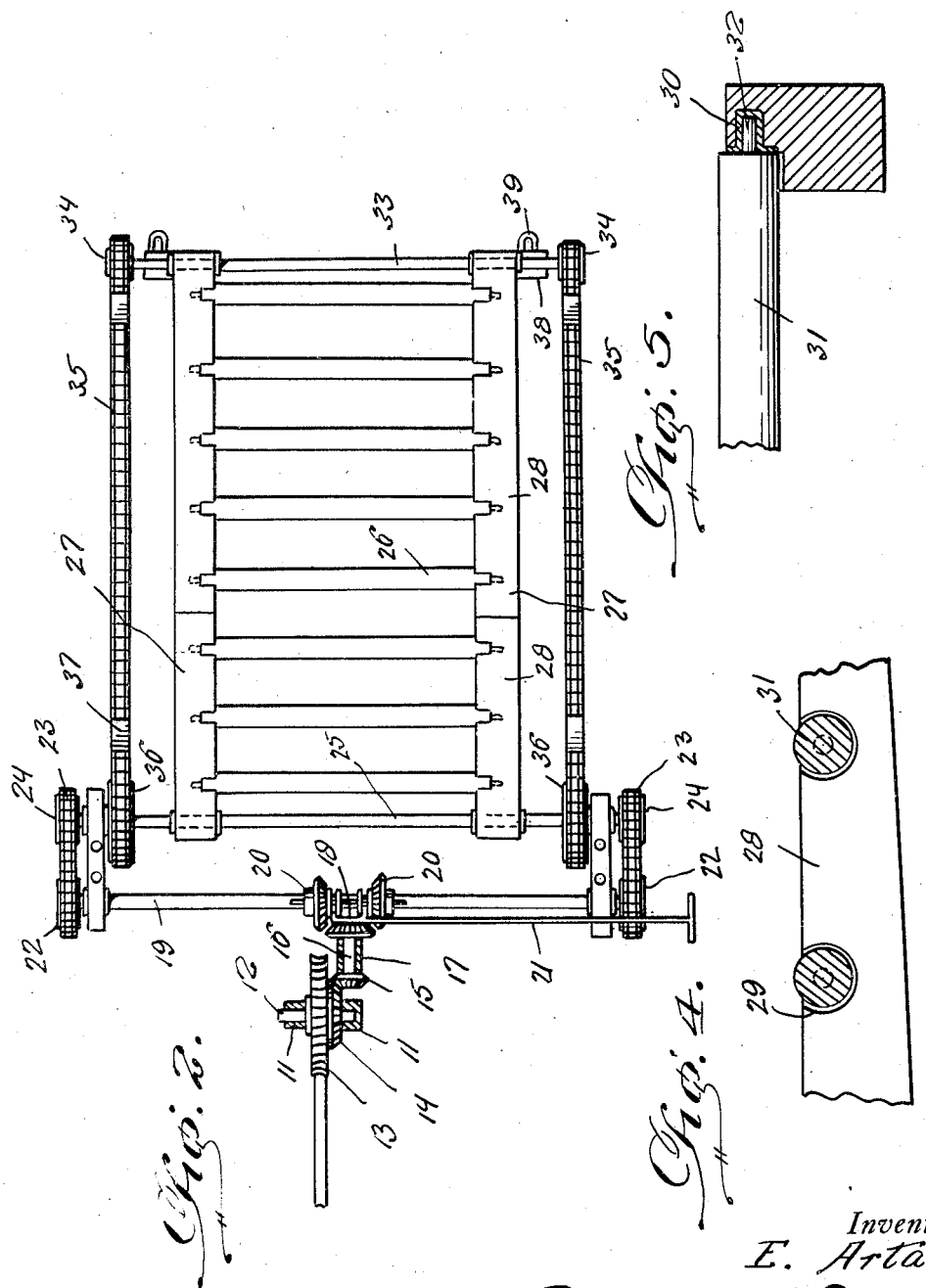
Inventor
E. Artas,
By Clarence A O'Brien
Attorney Patented Jan. 10, 1928.

1,655,686

UNITED STATES PATENT OFFICE.

EDWARD ARTAS, OF ELLSWORTH, KANSAS.

MOTOR-TRUCK LOADER.

Application filed January 15, 1926. Serial No. 81,494.

This invention relates to loading devices for motor trucks and has for its primary object to provide a device that is adapted to be associated with the rear end of a truck body and operable by the motor of the truck for loading articles onto or removing the same from the truck as the case may be.

A further and important object is to provide a loading device of this character that may be readily installed upon practically all types of motor trucks and that is adapted to form a permanent part of the truck, the construction of the device being such as to enable the major portion of the same to be swung upwardly beneath the body of the truck when not in use.

A still further object is to provide a loading device adaptable for ready association with a motor truck that may be manufactured and marketed at relatively low cost, and that is simple and efficient in operation, and of such a nature as not to readily become out of order.

With the above and other objects in view as the nature of the invention will be better understood, the same comprises the novel form, combination and arrangement of parts hereinafter more fully described, shown in the accompanying drawing and claimed.

In the drawings wherein like reference characters indicate corresponding parts throughout the various views:

Figure 1 is a diagrammatic side elevation of a conventional form of motor truck with which is associated my improved loading device.

Figure 2 is a top plan view of the loading mechanism per se.

Figure 3 is a perspective of one of the anti-friction rollers forming a part of the present invention in order that the articles may be moved upwardly and downwardly upon the device in an anti-frictional manner.

Figure 4 is a fragmentary side elevation of one of the roller supporting bars so constructed as to have the ends of the bars journaled therein, a pair of the rollers being shown in cross section for more clearly disclosing the manner of association of the same with the particular bar disclosed, and Figure 5 is a transverse section through one of said bars disclosing more clearly the means of journaling the rollers at their opposite ends in said bars.

Now having particular reference to the drawing, 5 in Figure 1 designates the usual fly wheel of the internal combustion engine (not shown) that is an essential part of the motor truck A. This fly wheel as usual is formed or otherwise provided with gear teeth upon its periphery and forms no part of the present invention, however the same is used in conjunction with my loading device in order that the same may be operated through the medium of said motor truck engine.

In carrying out my invention I provide a relatively elongated propeller shaft 6 suitably journaled beneath the truck body and in substantially parallel relation with the horizontal axes thereof as clearly shown in Figure 1. Upon the forward end of this shaft there is splined a gear 7 operable into or out of mesh with the gear teeth of the fly wheel 5 through the medium of a suitable foot actuating lever 8 that extends through the floor board of the truck body adjacent the driver's seat.

The propeller shaft 6 is journaled within a bearing adjacent its opposite end, said opposite end having keyed thereto a worm 10. Journaled above the worm of said propeller shaft 6 within suitable bearings 11—11, pendant from the truck body is a short stub shaft 12 to which is keyed a worm gear 13 in constant mesh with the worm 10 of said propeller shaft as clearly shown in said Figure 1.

Upon one side of the worm gear 13 is formed a relatively smaller beveled gear 14 that has mesh with the teeth of a relatively smaller bevel gear 15 upon one end of a stub shaft 16 that is journaled within a bearing 17 supported from the truck body, the other end of said stub shaft carrying a slightly larger bevel gear 18, as shown in Figure 2.

Extending transversely beneath the truck body in spaced relation with the end of the propeller shaft 6 is a shaft 19 on the intermediate portion of which is splined a pair of bevel gears 20—20 upon opposite sides of the bevel gear 17 of the stub shaft 16. Suitable means extending through one side of the truck and designated 21 is provided for engaging either bevel gear 20 with the bevel gear 18 for rotating the shaft 19 in opposite directions as desired.

The opposite ends of the shaft 19 carry sprocket gears 22—22 over which are trained sprocket chains 23—23 that extend rearwardly and upwardly as indicated in Figure 1 and are again trained over sprocket gears 24—24 upon the opposite ends of a shaft 25 parallel with the shaft 19, the same also being suitably journaled in bearings pendant from the motor truck body.

Pivotally disposed upon the last mentioned shaft 18 is a loading skid designated generally 26, the same comprising a pair of spaced side bars 27—27, each of which is formed from a pair of hinged sections 28—28 in order that said skid may be folded upwardly beneath the truck body as indicated by the dotted lines in Figure 1.

The opposed faces of the bars 27—27 at their upper edges are formed with transversely registering segmental notches 29, the inner face of each of which is provided with a bearing socket 30, as shown in Figure 5. Extending transversely across said bars 27—27 and fitting within the notches 29 of said bars are rollers 31 in spaced parallel relation, the opposite ends of each of which carry pintles 32 for rotatable mounting within the bearing sockets 30 of said side bars in order that the material moving upwardly or downwardly upon the skid may do so in an anti-friction manner, the rollers of course being free to rotate in either direction.

Journaled adjacent its opposite ends in aligned bearing openings in the outer lower ends of the bars 27—27 is a shaft 33, that carries upon its opposite ends sprocket gears 34—34 over which are trained sprocket chains 35—35 that extend in a direction toward the truck A, and are again trained over sprocket gears 36—36 upon the shaft 25 inwardly of the before mentioned sprocket gears 24—24 upon said shaft.

The chains 35—35 carry at spaced transversely aligned points flight hooks 37 in order that when said chains are actuated in a manner hereinafter described, the goods upon the flight, when the same is in the full line position of Figure 1 will be raised or lowered upon the body truck or from the same as the case may be.

In order that the lower end of the skid may be supported a desired distance above the ground surface to permit of the proper operation of the device, feet 38 are provided, the same being preferably formed upon or secured to the lower ends of the skid bars 27—27. Each foot carries a bail 39 that is adapted to engage over a hook 40 upon the truck body adjacent opposite sides thereof in order that the skid may be folded up into the dotted line position, and there maintained until the same is again ready for use.

It will at once be apparent that when the gear 7 upon the forward end of the propeller shaft 6 is engaged with the teeth of the fly wheel gear 5 when the engine of the truck is in operation, a movement of the chains 35—35 in an upward or downward direction, occasioned by the engagement of the predetermined gear 20—20 with the gear 18, goods may be readily raised onto the truck or lowered therefrom as the case may be.

Insomuch as the skid is pivotally mounted upon the rear end of the truck, the same may be disposed in any desired inclined or straight position with respect to the truck body in order that goods may be lowered to the ground, or upon a platform or raised from the ground, or from a platform as the case may be.

Having thus described the invention, what I claim as new and desire to secure by Letters Patent is:—

1. A folding endless conveyor for motor vehicle trucks comprising a rotatable shaft journaled transversely at the rear end of the truck body, a pair of spaced bars pivoted at their forward ends on said rotatable shaft, a second shaft journaled transversely through the outer ends of said bars, each of said bars comprising a pair of hingedly connected sections, endless flight chains adapted for rotation over the shafts adjacent the outer sides of the spaced bars, said hinged sections permitting the conveyor to be folded and swung beneath the rear end of the truck body, and means for holding the conveyor in such position.

2. A folding endless conveyor for motor vehicle trucks comprising a rotatable shaft journaled transversely at the rear end of the truck body, a pair of spaced bars pivoted at their forward ends on said rotatable shaft, a second shaft journaled tranversely through the outer ends of said bars, each of said bars comprising a pair of hingedly connected sections, endless flight chains adapted for rotation over the shafts adjacent the outer sides of the spaced bars, said hinged sections permitting the conveyor to be folded and swung beneath the rear end of the truck body, means for holding the conveyor in such position, said means comprising depending hooks attached to the side of the truck body adjacent the rear end thereof, and a bail attached to the outer end of each bar and adapted to engage the respective hook.

3. A folding endless conveyor for motor vehicle trucks, comprising a rotatable shaft journaled transversely at the rear end of the truck body, a pair of spaced bars pivoted at their forward ends on said rotatable shaft, an additional pair of spaced bars hingedly connected to the other ends of the aforementioned bars, a second shaft journaled transversely through the outer ends of the second mentioned pairs of bars, sprocket wheels carried by the outer ends of the shaft, endless flight chains trained over the alined sprocket wheels and arranged adjacent the outer sides of the spaced pairs of bars, anti-friction rollers supported between the pairs of bars, said hingedly connected bars permitting the conveyor to be folded and to be swung beneath the rear end of the truck body, and means for holding the conveyor in such position.

In testimony whereof I affix my signature.

EDWARD ARTAS.